United States Patent
Zhang et al.

(10) Patent No.: US 9,906,738 B2
(45) Date of Patent: Feb. 27, 2018

(54) WEAK TARGET DETECTION-ORIENTED MULTI-MODAL INFRARED IMAGING SYSTEM AND METHOD

(71) Applicants: NANJING HUATU INFORMATION TECHNOLOGY CO., LTD, Nanjing, Jiangsu (CN); Tianxu Zhang, Wuhan, Hubei (CN)

(72) Inventors: Tianxu Zhang, Hubei (CN); Xinyu Zhang, Hubei (CN)

(73) Assignees: Nanjing Huatu Information Technology Co., Ltd., Nanjing, Jiangsu (CN); Tianxu Zhang, Wuhan, Hubei (CN)

( * ) Notice: Subject to any disclaimer, the term of this patent is extended or adjusted under 35 U.S.C. 154(b) by 137 days.

(21) Appl. No.: 15/187,379

(22) Filed: Jun. 20, 2016

(65) Prior Publication Data
US 2017/0230590 A1 Aug. 10, 2017

(30) Foreign Application Priority Data
Dec. 31, 2015 (CN) .......................... 2015 1 1030103

(51) Int. Cl.
| | |
|---|---|
| H04N 5/33 | (2006.01) |
| G03B 13/14 | (2006.01) |
| G02B 17/08 | (2006.01) |
| G02B 26/10 | (2006.01) |
| H04N 5/232 | (2006.01) |
| H04N 5/225 | (2006.01) |
| H04N 5/238 | (2006.01) |
| G02B 13/14 | (2006.01) |

(52) U.S. Cl.
CPC .............. *H04N 5/33* (2013.01); *G02B 13/14* (2013.01); *G02B 17/0808* (2013.01); *G02B 26/101* (2013.01); *H04N 5/2254* (2013.01); *H04N 5/238* (2013.01); *H04N 5/23238* (2013.01)

(58) Field of Classification Search
CPC .... H04N 5/33; H04N 5/2254; H04N 5/23238; H04N 5/238; G02B 13/14; G02B 17/0808; G02B 26/101
See application file for complete search history.

(56) References Cited

U.S. PATENT DOCUMENTS

| | | | | |
|---|---|---|---|---|
| 3,562,529 A | * | 2/1971 | Engborg | ................... A61B 5/01 250/334 |
| 3,859,530 A | * | 1/1975 | Brewster | ................... H04N 3/09 250/334 |

\* cited by examiner

*Primary Examiner* — Michael Teitelbaum
(74) *Attorney, Agent, or Firm* — Hamre, Schumann, Mueller & Larson, P.C.

(57) ABSTRACT

A weak target detection-oriented multi-modal infrared imaging system includes an infrared optical window, a large-field of view (FOV) two-dimensional scanning mirror, a Cassegrain reflector group, a broadband spectrum relay mirror, a first lens group, a space-adjustable and transmittance-variable lens, a second lens group, a focal plane array (FPA) module, a data processing module and a space addressable transmittance modulation module. The data processing module generates a transmittance modulation control signal and an imaging integration time modulation signal according to an image data signal output by the FPA module, and the space-adjustable and transmittance-variable lens dynamically adjust an optical field transmittance under the effect of the transmittance modulation control signal. The FPA module adaptively adjusts an imaging integration time under the effect of the imaging integration time modulation signal.

6 Claims, 4 Drawing Sheets

WEAK TARGET DETECTION-ORIENTED MULTI-MODAL INFRARED IMAGING SYSTEM AND METHOD

TECHNICAL FIELD

The present invention relates to the field of remote sensing detection technologies, and in particular, to a weak target detection-oriented multi-modal infrared imaging system and method.

BACKGROUND ART

In an infrared remote sensing scenario, a dynamic range of infrared radiation and scattering is very large, while an infrared sensor merely has a limited dynamic range. When a weak target of the remote sensing detection is in a complicated background, the optical field energy of the weak target is located at a linear part of a response curve of an infrared imaging sensor, and in a case of high enough signal-to-noise ratio, the weak target is detectable. When the optical field energy of the weak target is located at a toe part of a response curve of an infrared imaging sensor or at a shoulder part of the response curve of the infrared imaging sensor, that is, located at a non-linear part of the response curve, the response rate is very low, and the weak target is non-detectable. For a case in which the weak target is located at the toe part of the response curve of the infrared imaging sensor, insufficient luminous flux causes the target to be non-detectable; for a case in which the weak target is located at the shoulder part of the response curve of the infrared imaging sensor, overlarge luminous flux causes the target to be non-detectable. In view of the above, the conventional infrared remote sensing detection apparatus does not have the capability to adapt to a scenario of large dynamic range radiation or scattering.

SUMMARY

Aiming at the above defects or improving requirements of the prior art, the present invention provides a weak target detection-oriented multi-modal infrared imaging system and method, so as to solve the problem that the conventional infrared remote sensing detection system cannot adapt to a scenario of large dynamic range radiation or scattering.

To achieve the above objective, according to an aspect of the present invention, a weak target detection-oriented multi-modal infrared imaging system is provided, including an infrared optical window, a large-field of view (FOV) two-dimensional scanning mirror, a Cassegrain reflector group, a broadband spectrum relay mirror, a first lens group, a space-adjustable and transmittance-variable lens, a second lens group, a focal plane array (FPA) module, a data processing module and a space addressable transmittance modulation module.

During work, an entrance pupil optical field of a target area is incident through the infrared optical window to the large-FOV two-dimensional scanning mirror, the large-FOV two-dimensional scanning mirror is used for tracking and aiming the target area, and reflecting the light of the target area to the Cassegrain reflector group. The Cassegrain reflector group collects the light reflected by the large-FOV two-dimensional scanning mirror and reflects it to the broadband spectrum relay mirror. The broadband spectrum relay mirror focuses the light reflected by the Cassegrain reflector group to the first lens group. Outgoing light of the first lens group is transmitted through the space-adjustable and transmittance-variable lens to the second lens group. Outgoing light of the second lens group is focused to the FPA module for infrared imaging, so as to acquire an image sequence, and digital-to-analog (A/D) conversion is performed on the image sequence to generate image data. The data processing module processes the image data and generates a transmittance modulation control signal. The space addressable transmittance modulation module generates a voltage control signal under the effect of the transmittance modulation control signal. The space-adjustable and transmittance-variable lens dynamically adjusts a transmittance under the effect of the voltage control signal.

The first lens group is a broadband spectrum lens group, used for compensating and correcting spot quality of infrared broadband spectrum energy convergence.

The space-adjustable and transmittance-variable lens is plated with a metal addressable transmittance-variable filtering film array, so as to implement switching of the optical field transmittance. The metal addressable transmittance-variable filtering film array implements continuous switching of the film transmittance under the control of a space addressable transmittance module.

The second lens group is a broadband spectrum lens group, used for focusing the outgoing light of the space-adjustable and transmittance-variable lens to the FPA module, and performing infrared imaging of the target on the FPA module.

The FPA module is integrated with an A/D conversion function, and can directly convert the image sequence obtained by the infrared imaging into a digital signal for output.

The data processing module is used for extracting a target optical field energy value and a background optical field energy value, and according to the target optical field energy value and the background optical field energy value, acquiring a transmittance modulation control signal and an integration time control signal.

In the weak target detection-oriented multi-modal infrared imaging system provided in the present invention, the detected target light intensity and the background optical field intensity are compared and analyzed through a digital signal processing module, so as to obtain regulation signals of the FPA and the space-adjustable and transmittance-variable lens. By regulating the integration time of the FPA and the transmittance of the space-adjustable and transmittance-variable lens, the target optical field and the background optical field are both adjusted to the linear part of the response curve of the infrared imaging sensor, thereby achieving the objective of identifying a weak target in a case of insufficient luminous flux or overlarge luminous flux.

Preferably, in the weak target detection-oriented multi-modal infrared imaging system, the imaging integration time of the FPA module is adjustable; the data processing module generates an integration time control signal according to the image data, and the FPA module adjusts the imaging integration time in real time under the effect of the integration time control signal.

Preferably, in the weak target detection-oriented multi-modal infrared imaging system, the Cassegrain reflector group adopts a Cassegrain system, is composed of a parabolic reflector and a hyperbolic reflector, and is used for performing infrared spectrum imaging on the target and energy collection. A shielding ratio of the parabolic reflector to the hyperbolic reflector is not greater than 1:3.

Preferably, in the weak target detection-oriented multi-modal infrared imaging system, the space-adjustable and transmittance-variable lens Lens(x,y,λ,t) adopts a metal or graphene material, and the optical field transmittance thereof is spatially adjustable and may be adjusted by addressing according to an external control signal, where, $\lambda$ is an imaging wavelength, (x,y) are spatial coordinates, and t is time.

To implement the objective of the present invention, according to another aspect of the present invention, a weak target detection-oriented multi-modal infrared imaging method is provided, specifically including the following steps:

(1) reflecting and gathering an entrance pupil optical field $f_1(x,y,\lambda,t)$;

where, $f_1(x,y,\lambda,t)=T(x,y,\lambda,t)+F_b(x,y,\lambda,t)$;

where, $T(x,y,\lambda,t)$ is optical field energy radiated or scattered by a detected target, $F_b(x,y,\lambda,t)$ is optical field energy radiated or scattered by background; $F_b(x,y,\lambda,t)$ has a large optical field intensity change range; and $\lambda$ is an imaging wavelength, (x,y,) are spatial coordinates, and t is time;

(2) processing the light after being reflected and gathered, through a space-adjustable and transmittance-variable lens Lens(x,y,$\lambda$,t) to change the luminous flux, so as to obtain a filtered optical field $\tilde{f}_1(x,y,\lambda,t)$ (initially no changing transmittance);

(3) performing first infrared imaging on the filtered optical field $\tilde{f}_1(x,y,\lambda,t)$, so as to obtain a field space distributed optical field $f_P(x,y,\lambda,t)$;

(4) determining whether the optical field $f_P(x,y,\lambda,t)$ is located at a linear part of a response curve of an infrared imaging sensor, if yes, performing step (5); otherwise, performing step (6);

(5) comparing the detected target optical field $T(x,y,\lambda,t)$ and the background optical field $F_b(x,y,\lambda,t)$, and if $T(x,y,\lambda,t)$ is less than $F_b(x,y,\lambda,t)$ by 1 to 3 orders of magnitude, indicating that the signal-to-noise ratio of the detected target is insufficient, and performing step (9), if not, performing step (10); otherwise, taking the field space distributed optical field $f_P(x,y,\lambda,t)$ obtained in step (3) as an image of the detected target;

(6) performing spatial low-pass filtering on the field space distributed optical field $f_P(x,y,\lambda,t)$, so as to obtain optical field data $\bar{f}_P(x,y,\lambda,t)$; and generating a transmittance modulation control signal according to the optical field data $\bar{f}_P(x,y,\lambda,t)$;

(7) performing spatial adjustment on the optical field transmittance of the filtered optical field $\tilde{f}_f(x,y,\lambda,t)$ under the effect of the transmittance modulation control signal, so as to filter out a strong light area in the spatial optical field to obtain an effective optical field $\hat{I}(x,y,\lambda,t)$; where, $\hat{I}(x,y,\lambda,t)=\hat{T}(x,y,\lambda,t)+\hat{F}_b(x,y,\lambda,t)$;

(8) performing integration processing on the effective optical field $\hat{I}(x,y,\lambda,t)$, so as to amplify the optical field of the detected target, to obtain a secondary imaging infrared image $f(x,y,\lambda,t)$, then performing step (5);

where, $f(x,y,\lambda,t)=k\hat{I}(x,y,\lambda,t)$, k is an amplification factor, and k is greater than 1;

(9) increasing the imaging integration time of the FPA module, and performing step (10);

in this step, the increasing the imaging integration time of the FPA module further enhances the imaging signal-to-noise ratio of the weak target signal; and

(10) performing segmentation processing on the second imaging infrared image $f(x,y,\lambda,t)$, extracting a feature and identifying the feature, so as to obtain an image of the detected target.

In the above method, the strong light area of the background optical field is filtered out by spatial adjustment of the transmittance, and the target optical field is amplified by integration, so that the target optical field and the background optical field are both adjusted to the linear part of the response curve of the infrared imaging sensor, and the signal-to-noise ratio of the weak target is improved, thereby achieving the objective of detecting a weak target in a case of insufficient luminous flux or overlarge luminous flux.

Preferably, in the weak target detection-oriented multi-modal infrared imaging method, the adjusting method of the optical field transmittance is specifically that:

(a) for the optical field data $\bar{f}_P(x,y,\lambda,t)$, if the background optical field intensity therein is in a shoulder non-linear area (saturation) of the response curve of the infrared imaging sensor, it indicates that the luminous flux of the detected target is overlarge, that is, the detected target is in a strong background optical field;

a transmittance modulation control signal is generated, the space addressable transmittance modulation module outputs an adjustable voltage under the effect of the transmittance modulation control signal; and the space-adjustable and transmittance-variable lens reduces the optical field transmittance under the effect of the voltage, and adjusts the target optical field transmittance to the linear area of the response curve of the infrared imaging sensor; and (b) for the optical field data $\bar{f}_P(x,y,\lambda,t)$, if the background optical field intensity therein is in a toe non-linear area (insufficient exposure) of the response curve of the infrared imaging sensor, it indicates that the luminous flux of the detected target is insufficient, that is, the detected target is in a weak background optical field;

a transmittance modulation control signal is generated, the space addressable transmittance modulation module outputs an adjustable voltage under the effect of the transmittance modulation control signal; and the space-adjustable and transmittance-variable lens increases the optical field transmittance under the effect of the voltage, and adjusts the target optical field transmittance to the linear area of the response curve of the infrared imaging sensor.

By means of the above method, the optical field transmittance is adjusted in real time according to the imaging image data, thereby adjusting the target optical field transmittance to the linear area of the response curve of the infrared imaging sensor.

In general, compared with the prior art, the above technical solutions according to the present invention can have the following beneficial effects:

(1) the weak target detection-oriented multi-modal infrared imaging system provided in the present invention combines digital signal processing and an infrared optical system, and uses the digital signal processing module to process imaging image data to obtain regulation signals of the FPA and the space-adjustable and transmittance-variable lens; by regulating the integration time of the FPA and the transmittance of the space-adjustable and transmittance-variable lens, the processed target optical field and background optical field are both located at the linear part of the response curve of the infrared imaging sensor, thereby achieving the objective of identifying a weak target in a case of insufficient luminous flux or overlarge luminous flux; and the weak target detection-oriented multi-modal infrared imaging system has a function of identifying a weak target in both a strong background optical field and a weak background optical field;

(2) the weak target detection-oriented multi-modal infrared imaging system and method provided in the present invention performs real-time processing on the imaging image data by using the digital signal processing module, and adaptively adjusts the imaging integration time, thereby effectively improving the imaging signal-to-noise ratio, and improving the capability to identify a weak target by the remote sensing infrared detection; and an optimal identification effect may be achieved in different using environments and for different observation targets;

(3) the weak target detection-oriented multi-modal infrared imaging system provided in the present invention adopts the space-adjustable and transmittance-variable lens, the lens can adjust the optical field transmittance in real time under the control of the digital signal processing module the space addressable transmittance modulation module; moreover, the lens is plated with the metal addressable transmittance-variable filtering film array, and the metal addressable transmittance-variable filtering film array implements continuous switching of the film transmittance under the control of the space addressable transmittance module; the system has a function of adjusting luminous flux in strong and weak background optical fields in multiple modals; and the target effective optical field is acquired by changing the target optical field transmittance, thereby further improving the capability to identify a weak target by the remote sensing infrared detection; and (4) the weak target detection-oriented multi-modal infrared imaging system provided in the present invention may control its digital signal processing module by programming, which implements control on the FPA, the space addressable transmittance modulation module and the space-adjustable and transmittance-variable lens; therefore, it is intelligent, has a small size, high integration, convenience and flexibility in use, and can be widely applied in the fields of national economy and national security.

In all accompanying drawings, the same reference signs are used to indicate the same elements or structures, where: 1-infrared optical window, 2-large-FOV two-dimensional scanning mirror, 3-Cassegrain reflector group, 4-broadband spectrum relay mirror, 5-first lens group, 6-space-adjustable and transmittance-variable lens, 7-second lens group, 8-FPA module, 9-data processing module, 10-space addressable transmittance modulation module.

DETAILED DESCRIPTION

In order to make the objectives, technical solutions and advantages of the present invention more comprehensible, the present invention is further described in detail below in combination with the accompanying drawings and the embodiments. It should be understood that, the specific embodiments described herein are merely used to explain the present invention, and are not intended to limit the present invention. Moreover, technical features involved in the implementation manners of the present invention described in the following may be combined with each other as long as no conflict is caused.

Figure 1:
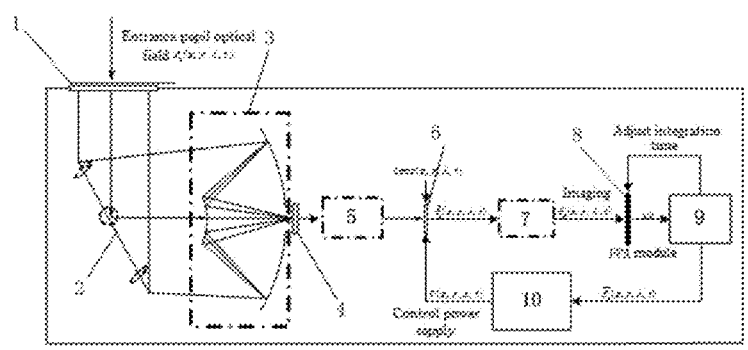
FIG. 1 is a system block diagram of a weak target detection-oriented multi-modal infrared imaging system according to an embodiment.

An embodiment provides a weak target detection-oriented multi-modal infrared imaging system, a system block diagram thereof is shown in FIG. 1, and the system includes an infrared optical window 1, a large-FOV two-dimensional scanning mirror 2, a Cassegrain reflector group 3, a broadband spectrum relay mirror 4, a first lens group 5, a space-adjustable and transmittance-variable lens 6, a second lens group 7, an FPA module 8, a data processing module 9 and a space addressable transmittance modulation module 10.

During work, an entrance pupil optical field $f_1(x,y,\lambda,t)$ of a target area is incident through the infrared optical window 1 to the large-FOV two-dimensional scanning mirror 2, the large-FOV two-dimensional scanning mirror 2 is used for tracking and aiming the target area, and reflecting the light of the target area to the Cassegrain reflector group 3. The Cassegrain reflector group 3 collects the light reflected by the large-FOV two-dimensional scanning mirror and reflects it to the broadband spectrum relay mirror 4. The broadband spectrum relay mirror 4 focuses the light reflected by the Cassegrain reflector group 3 to the first lens group 5. Outgoing light of the first lens group 5 is transmitted through the space-adjustable and transmittance-variable lens 6 to the second lens group 7. Outgoing light of the second lens group 7 is focused to the FPA module 8 for infrared imaging, so as to acquire an image sequence, and A/D conversion is performed on the image sequence to generate image data. The data processing module 9 processes the image data and generates an integration time control signal and a transmittance modulation control signal. The FPA module 8 can adjust the integration time in real time under the effect of the integration time control signal. The space addressable transmittance modulation module 10 generates a voltage control signal under the effect of the transmittance modulation control signal. The space-adjustable and transmittance-variable lens 6 dynamically adjusts an optical field transmittance under the effect of the voltage control signal.

In the embodiment, the large-FOV two-dimensional scanning mirror 2 adopts K9 glass, and a gold-plated reflecting layer thereof has a higher reflectivity to infrared light. The Cassegrain reflector group 3 adopts a Cassegrain system, is composed of a parabolic reflector and a hyperbolic reflector, and is used for performing infrared spectrum imaging on the target and energy collection. A shielding ratio of the parabolic reflector to the hyperbolic reflector is not greater than 1:3.

Figure 2:
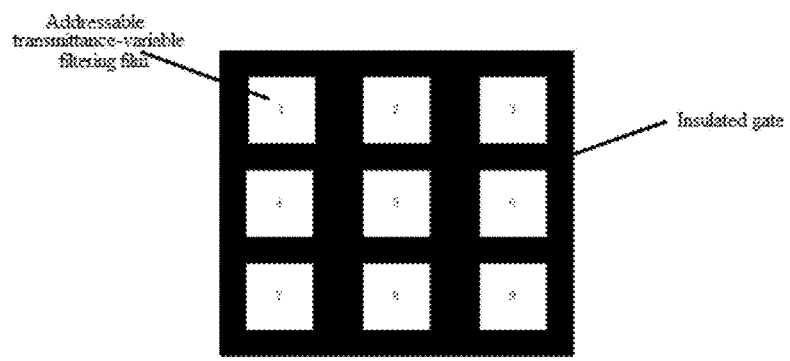
FIG. 2 is a schematic diagram of a metal addressable transmittance-variable filtering film array in an embodiment.

In the embodiment, the first lens group 5 is a broadband spectrum lens group, the space-adjustable and transmittance-variable lens 6 is plated with a metal addressable transmittance-variable filtering film array, and can implement switching of the optical field transmittance; the metal addressable transmittance-variable filtering film array is shown in FIG. 2, and can implement continuous switching of the film transmittance under the control of the space addressable transmittance module.

The second lens group 7 is also a broadband spectrum lens group, used for focusing the outgoing light of the space-adjustable and transmittance-variable lens 6 to the FPA module 8, and performing infrared imaging of the target on the FPA module 8.

In the embodiment, the FPA module 8 is integrated with an A/D conversion function, and can directly convert the image sequence obtained by the infrared imaging into a digital signal for output.

The data processing module is used for extracting a target optical field energy value and a background optical field energy value according to the digital signal output by the FPA imaging module 8, and acquiring a transmittance modulation control signal and an integration time control signal according to the two energy values.

In the embodiment, the first lens group 5 and the second lens group 7 adopt an optical athermalization technology, and when the ambient temperature changes between −40° C. and +60° C., the position of an imaging surface keeps stable and unchanged, and a focusing structure is omitted.

In combination with the above weak target detection-oriented multi-modal infrared imaging system provided in the embodiment, a weak target detection-oriented multi-modal infrared imaging method provided in the present invention is described in detail in the following.

Embodiment 1

In Embodiment 1, $T(x,:$ and $F_b(x,:$ in an entrance pupil optical field $f_1(x,y,\lambda,t)$ are located at a linear part of a response curve of an infrared imaging sensor;

and $0.1* F_b(x,:< T(x,:< F_b(x,:$.

Figure 3:
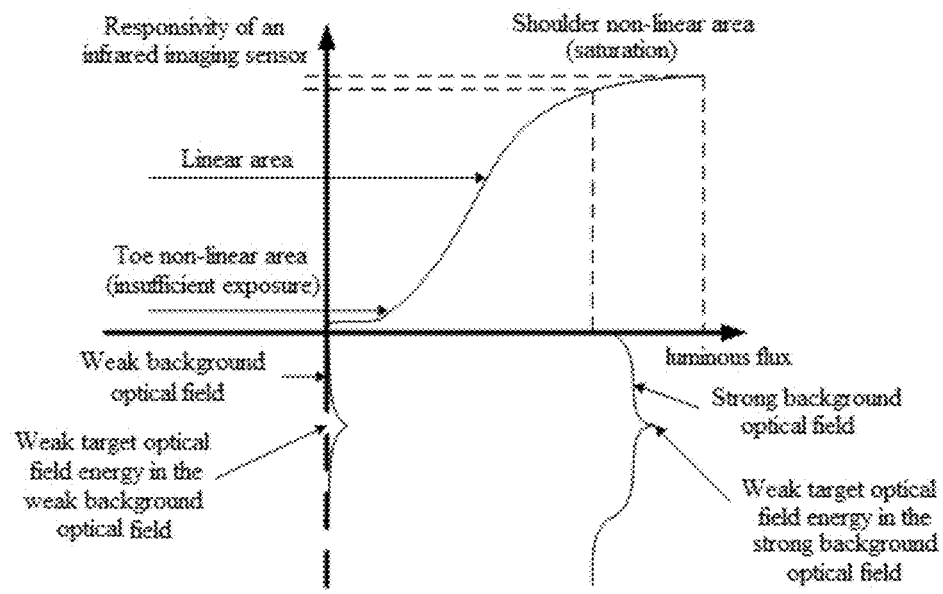
FIG. 3 is a schematic diagram of a weak target and infrared response thereof in a weak background optical field and a strong background optical field in Embodiment 1.
Figure 4:
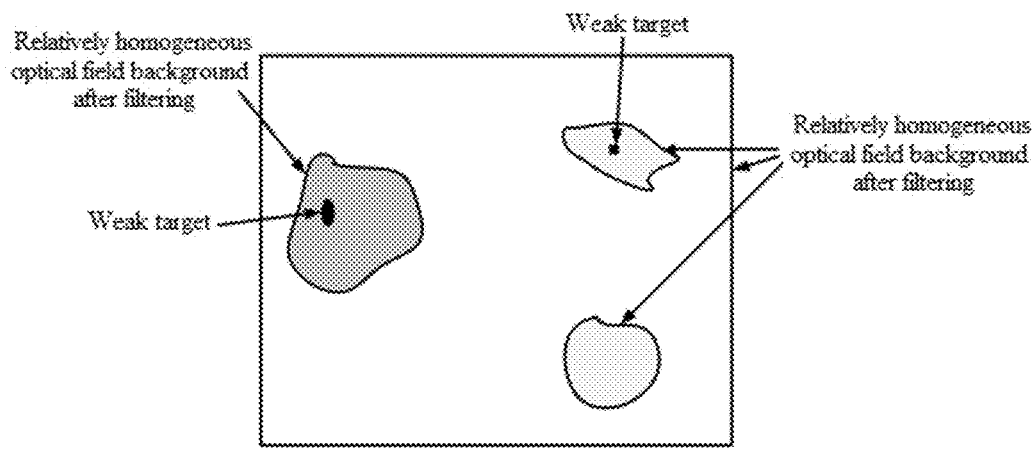
FIG. 4 is a schematic diagram of a detected target and background optical field overlapping model in Embodiment 1 after being filtered.

The weak target detection-oriented multi-modal infrared imaging method provided in Embodiment 1 specifically includes:

(1) reflecting and gathering an entrance pupil optical field $f_1(x,y,\lambda,t)$;

where, $f_1(x,y,\lambda,t)=T(x,y,\lambda,t)+F_b(x,y,\lambda,t)$;

where, $T(x,y,\lambda,t)$ is optical field energy radiated or scattered by a detected target, $F_b(x,y,\lambda,t)$ is optical field energy radiated or scattered by background; and $F_b(x,y,\lambda,t)$ has a large optical field intensity change range, a schematic diagram thereof is shown in FIG. 3; where, $\lambda$ is an imaging wavelength, (x,y) are spatial coordinates, and t is time;

(2) processing the light after being reflected and gathered, through a space-adjustable and transmittance-variable lens Lens(x,y,λ,t), to change the luminous flux, so as to obtain a filtered optical field $\tilde{f}_1(x,y,\lambda,t)$ (initially no changing transmittance); a filtered optical field model is shown in FIG. 4;

(3) performing first infrared imaging on the filtered optical field $\tilde{f}_1(x,y,\lambda,t)$, so as to obtain a field space distributed optical field $f_P(x,y,\lambda,t)$; and taking the field space distributed optical field $f_P(x,y,\lambda,t)$ as a detected target optical field.

Figure 5:
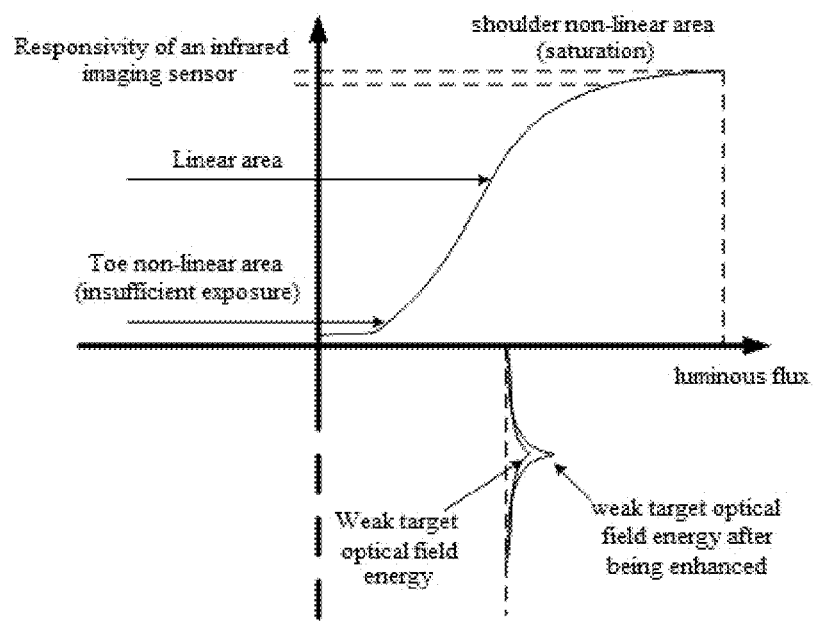
FIG. 5 is a schematic response diagram of a weak target signal after being amplified by integration processing in Embodiment 2.

In Embodiment 2, the weak target detection-oriented multi-modal infrared imaging method provided in the present invention is adopted in a daytime condition to perform weak target detection; in the scenario of daytime, the overall optical field energy is strong, and therefore, the integration time of a focal plane receiving the optical field energy needs to be adjusted. Steps (1) to (3) in this embodiment are the same as those in Embodiment 1, and the rest of steps are specifically as follows:

(4) determining whether $T(x,y,\lambda,t)$ and $F_b(x,y,\lambda,t)$ in the entrance pupil optical field $F_1(x,y,\lambda,t)$ in the daytime condition are located at the linear part of the response curve of the infrared imaging sensor, and if yes, performing step (5); if not, performing step (6);

(5) comparing the detected target optical field $T(x,y,\lambda,t)$ and the background optical field $F_b(x,y,\lambda,t)$, and if $T(x,y,\lambda,t)$ is less $F_b(x,y,\lambda,t)$ than by 1 to 3 orders of magnitude, indicating that the signal-to-noise ratio of the detected target is insufficient, and performing step (9); otherwise, taking the field space distributed optical field $f_P(x,y,\lambda,t)$ obtained in step (3) as a detected target optical field;

(6) performing spatial low-pass filtering on the field space distributed optical field $f_P(x,y,\lambda,t)$, so as to obtain optical field data $\tilde{f}_P(x,y,\lambda,t)$; and generating a transmittance modulation control signal according to the optical field data $\tilde{f}_P(x,y,\lambda,t)$;

(7) performing spatial adjustment on the optical field transmittance of the filtered optical field $\tilde{f}_1(x,y,\lambda,t)$ under the effect of the transmittance modulation control signal, so as to filter out a strong light area in the spatial optical field to obtain an effective optical field $\hat{f}(x,y,\lambda,t)$; where, $\hat{f}(x,y,\lambda,t)=\hat{T}(x,y,\lambda,t)+\hat{F}_b(x,y,\lambda,t)$;

(8) performing integration processing on the effective optical field $\hat{f}(x,y,\lambda,t)$, so as to amplify the optical field of the detected target, to obtain a secondary imaging infrared image $f(x,y,\lambda,t)$, then performing step (5);

where, $f(x,y,\lambda,t)=k\hat{f}(x,y,\lambda,t)$, an amplification factor k is 10; in this embodiment, a schematic response diagram of a weak target signal after being amplified by integration processing is shown in FIG. 5;

(9) increasing the imaging integration time of the FPA module; and

(10) performing segmentation processing on the second imaging infrared image $f(x,y,\lambda,t)$, extracting a feature and identifying the feature, so as to obtain an image of the detected target.

Figure 6:
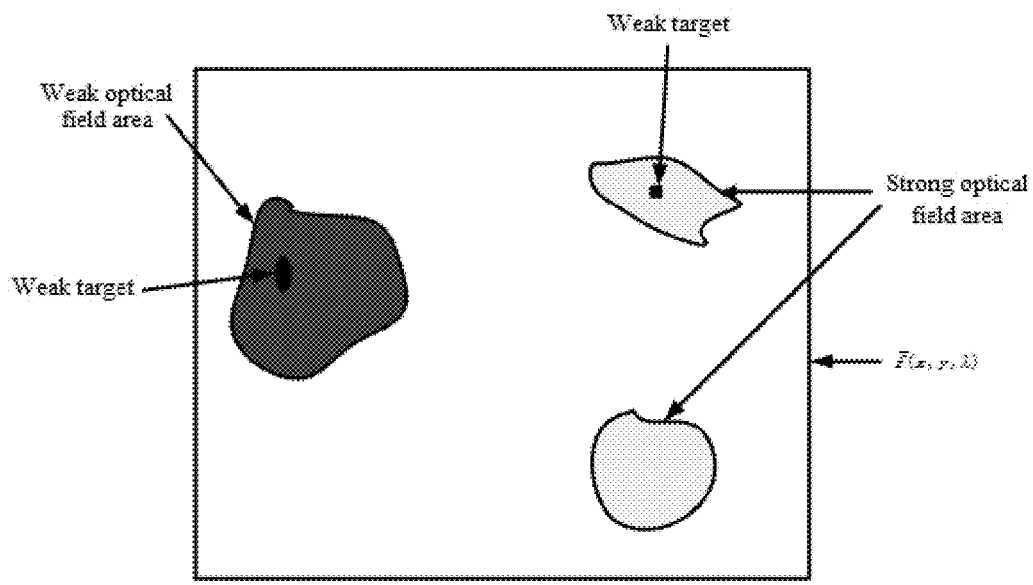
FIG. 6 is a schematic diagram of an optical field energy model before optical field filtering in Embodiment 3.
Figure 7:
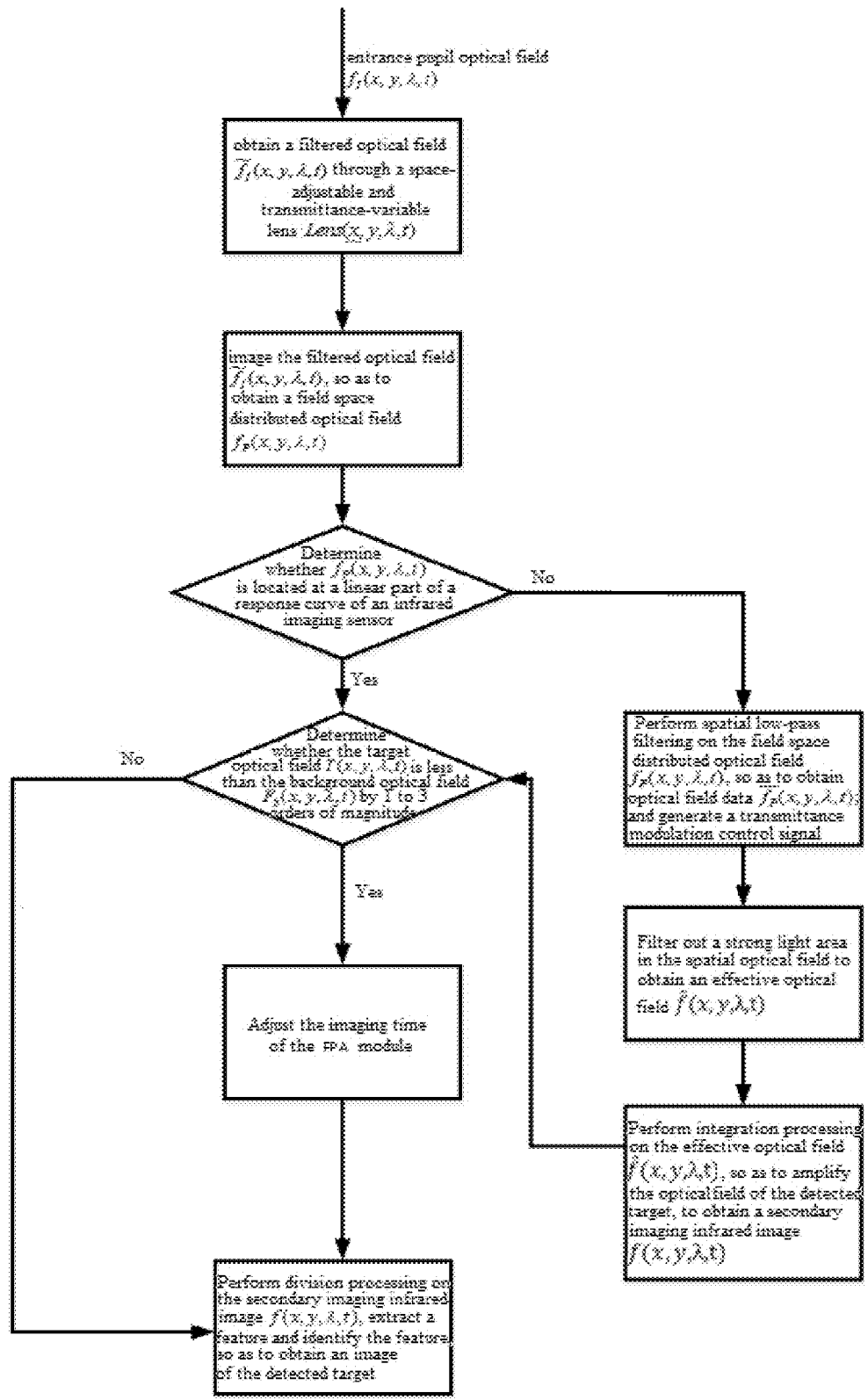
FIG. 7 is a flow chart of a weak target detection-oriented multi-modal infrared imaging method in Embodiment 3.

In Embodiment 3, weak target detection is performed by using the weak target detection-oriented multi-modal infrared imaging method provided in the present invention in a night scenario. An optical field energy model before optical field filtering is shown in FIG. 6, the overall energy is weak, and the integration time of the focal plane receiving the optical field energy needs to be adjusted. The process of this embodiment is shown in FIG. 7, steps (1) to (3) thereof are the same as those in Embodiment 1, and other steps are specifically as follows:

(4) determining whether $T(x,y,\lambda,t)$ and $F_b(x,y,\lambda,t)$ in the entrance pupil optical field $f_1(x,y,\lambda,t)$ in the night condition are located at the linear part of the response curve of the infrared imaging sensor, and if yes, performing step (5); if not, performing step (6);

(5) comparing the detected target optical field $T(x,y,\lambda,t)$ and the background optical field $F_b(x,y,\lambda,t)$, and if $T(x,y,\lambda,t)$ is less than $F_b(x,y,\lambda,t)$ by 1 to 3 orders of magnitude, indicating that the signal-to-noise ratio of the detected target is insufficient, and performing step (9); otherwise, taking the field space distributed optical field $f_P(x,y,\lambda,t)$ obtained in step (3) as a detected target optical field;

(6) performing spatial low-pass filtering on the field space distributed optical field $f_P(x,y,\lambda,t)$, so as to obtain optical field data $\tilde{f}_P(x,y,\lambda,t)$; and generating a transmittance modulation control signal according to the optical field data $\tilde{f}_P(x,y,\lambda,t)$;

(7) performing spatial adjustment on the optical field transmittance of the filtered optical field $\tilde{f}_1(x,y,\lambda,t)$ under the effect of the transmittance modulation control signal, so as to filter out a strong light area in the spatial optical field to obtain an effective optical field $\hat{f}(x,y,\lambda,t)$; where, $\hat{f}(x,y,\lambda,t)=\hat{T}(x,y,\lambda,t)+\hat{F}_b(x,y,\lambda,t)$;

(8) performing integration processing on the effective optical field $\hat{f}(x,y,\lambda,t)$, so as to amplify the optical field of the detected target, to obtain a secondary imaging infrared image $f(x,y,\lambda,t)$, then performing step (5);

where, $f(x,y,\lambda,t)=k\hat{f}(x,y,\lambda,t)$; in Embodiment 3, an amplification factor k is 50;

(9) increasing the imaging integration time of the FPA module; and performing step (10);

(10) performing segmentation processing on the second imaging infrared image f(x,y,λ,t), extracting a feature and identifying the feature, so as to obtain an image of the detected target.

A person skilled in the art can easily understand that the above descriptions are merely preferred embodiments of the present invention, and are not intended to limit the present invention. Any modification, equivalent replacement and improvement made without departing from the spirit and principle of the present invention shall all fall within the protection scope of the present invention.

The invention claimed is:

1. A weak target detection-oriented multi-modal infrared imaging system, comprising: an infrared optical window (1), a large-field of view (FOV) two-dimensional scanning mirror (2), a Cassegrain reflector group (3), a broadband spectrum relay mirror (4), a first lens group (5), a space-adjustable and transmittance-variable lens (6), a second lens group (7), a focal plane array (FPA) module (8), a data processing module (9) and a space addressable transmittance modulation module (10), wherein in a working state, an entrance pupil optical field of a target area is incident through the infrared optical window (1) to the large-FOV two-dimensional scanning mirror (2), the large-FOV two-dimensional scanning mirror (2) reflects the light of the target area to the Cassegrain reflector group (3); the Cassegrain reflector group (3) collects the light reflected by the large-FOV two-dimensional scanning mirror (2) and reflects it to the broadband spectrum relay mirror (4); the broadband spectrum relay mirror (4) focuses the light reflected by the Cassegrain reflector group (3) to the first lens group (5);

outgoing light of the first lens group (5) is transmitted through the space-adjustable and transmittance-variable lens (6) to the second lens group (7); outgoing light of the second lens group (7) is focused to the FPA module (8) for infrared imaging, so as to acquire an image sequence, and digital-to-analog conversion is performed on the image sequence to generate image data; the data processing module (9) generates a transmittance modulation control signal according to the image data; the space addressable transmittance modulation module (10) generates a voltage control signal under the effect of the transmittance modulation control signal; and the space-adjustable and transmittance-variable lens (6) dynamically adjusts an optical field transmittance under the effect of the voltage control signal.

2. The multi-modal infrared imaging system according to claim 1, wherein, an imaging integration time of the FPA module (8) is adjustable; the data processing module (9) generates an integration time control signal according to the image data, and the FPA module (8) adjusts the imaging integration time in real time under the effect of the integration time control signal.

3. The multi-modal infrared imaging system according to claim 1, wherein, the Cassegrain reflector group (3) comprises a parabolic reflector and a hyperbolic reflector, and a shielding ratio of the parabolic reflector to the hyperbolic reflector is not greater than 1:3.

4. The multi-modal infrared imaging system according to claim 1, wherein, the space-adjustable and transmittance-variable lens (6) adopts a metal or graphene material; and the optical field transmittance of the space-adjustable and transmittance-variable lens (6) can be adjusted by addressing according to an external control signal.

5. A multi-modal infrared imaging method based on the weak target detection-oriented multi-modal infrared imaging system according to claim 1, specifically comprising:

(1) reflecting and gathering an entrance pupil optical field $f_1(x,y,\lambda,t)$;

wherein, $f_1(x,y,\lambda,t)=T(x,y,\lambda,t)+F_b(x,y,\lambda,t)$;

wherein, $T(x,y,\lambda,t)$ is optical field energy radiated or scattered by a detected target, $F_b(x,y,\lambda,t)$ is optical field energy radiated or scattered by background; $F_b(x,y,\lambda,t)$ has a large optical field intensity change range; and λ is an imaging wavelength, (x,y) are spatial coordinates, and t is time;

(2) processing the light after being reflected and gathered, through a space-adjustable and transmittance-variable lens, to change the luminous flux, so as to obtain a filtered optical field $\tilde{f}_1(x,y,\lambda,t)$ (initially no changing transmittance);

(3) performing first infrared imaging on the filtered optical field $\tilde{f}_1(x,y,\lambda,t)$, so as to obtain a field space distributed optical field $f_P(x,y,\lambda,t)$;

(4) determining whether the optical field $F_P(x,y,\lambda,t)$ is located at a linear part of a response curve of an infrared imaging sensor, if yes, performing step (5); otherwise, performing step (6);

(5) comparing the detected target optical field $T(x,y,\lambda,t)$ and the background optical field $F_b(x,y,\lambda,t)$, and if $T(x,y,\lambda,t)$ is less than $F_b(x,y,\lambda,t)$ by 1 to 3 orders of magnitude, performing step (9); otherwise, performing step (10);

(6) performing spatial low-pass filtering on the field space distributed optical field) $f_P(x,y,\lambda,t)$, so as to obtain optical field data $\tilde{f}_P(x,y,\lambda,t)$; and generating a transmittance modulation control signal according to the optical field data $\tilde{f}_P(x,y,\lambda,t)$;

(7) performing spatial adjustment on the optical field transmittance of the filtered optical field $\tilde{f}_1(x,y,\lambda,t)$ under the effect of the transmittance modulation control signal, so as to filter out a strong light area in the spatial optical field to obtain an effective optical field $\hat{f}(x,y,\lambda,t)$;

(8) performing integration processing on the effective optical field $\hat{f}(x,y,\lambda,t)$, so as to amplify the optical field of the detected target, to obtain a secondary imaging infrared image $f(x,y,\lambda,t)$, then performing step (5);

wherein, $f(x,y,\lambda,t)=k\hat{f}(x,y,\lambda,t)$, k is an amplification factor, and k is greater than 1;

(9) increasing the imaging integration time of the FPA module, and performing step (10); and

(10) performing segmentation processing on the second imaging infrared image f(x,y,λ,t), extracting a feature and identifying the feature, so as to obtain an image of the detected target.

6. The multi-modal infrared imaging method according to claim 5, wherein, the adjusting method of the optical field transmittance is specifically that:

(a) for the optical field data $\tilde{f}_P(x,y,\lambda,t)$, if the background optical field intensity therein is in a shoulder non-linear area of the response curve of the infrared imaging sensor, it indicates that the luminous flux of the detected target is overlarge, that is, the detected target is in a strong background optical field;

the space addressable transmittance modulation module outputs an adjustable voltage under the effect of the transmittance modulation control signal; and the space-adjustable and transmittance-variable lens reduces the optical field transmittance under the effect of the voltage, and adjusts the target optical field transmittance to the linear area of the response curve of the infrared imaging sensor; and (b) for the optical field data $\bar{I}_P(x,y,\lambda,t)$, if the background optical field intensity therein is in a toe non-linear area of the response curve of the infrared imaging sensor, it indicates that the luminous flux of the detected target is insufficient, that is, the detected target is in a weak background optical field;

the space addressable transmittance modulation module outputs an adjustable voltage under the effect of the transmittance modulation control signal; and the space-adjustable and transmittance-variable lens increases the optical field transmittance under the effect of the voltage, and adjusts the target optical field transmittance to the linear area of the response curve of the infrared imaging sensor.

\* \* \* \* \*